No. 765,997. PATENTED JULY 26, 1904.
G. H. SHELLABERGER.
ORE ROASTING FURNACE.
APPLICATION FILED FEB. 1, 1904.
NO MODEL. 6 SHEETS—SHEET 1.

No. 765,997. PATENTED JULY 26, 1904.
G. H. SHELLABERGER.
ORE ROASTING FURNACE.
APPLICATION FILED FEB. 1, 1904.
NO MODEL. 6 SHEETS—SHEET 3.

Witnesses,

Inventor,
George H. Shellaberger,
By Offield Towle & Linthicum
Attys.

No. 765,997. PATENTED JULY 26, 1904.
G. H. SHELLABERGER.
ORE ROASTING FURNACE.
APPLICATION FILED FEB. 1, 1904.
NO MODEL. 6 SHEETS—SHEET 4.

Witnesses,
Inventor,
George H. Shellaberger
By Offield Towle & Linthicum
Attys.

No. 765,997. PATENTED JULY 26, 1904.
G. H. SHELLABERGER.
ORE ROASTING FURNACE.
APPLICATION FILED FEB. 1, 1904.
NO MODEL. 6 SHEETS—SHEET 5.

Witnesses,
Inventor,

No. 765,997. PATENTED JULY 26, 1904.
G. H. SHELLABERGER.
ORE ROASTING FURNACE.
APPLICATION FILED FEB. 1, 1904.
NO MODEL.
6 SHEETS—SHEET 6.

No. 765,997. Patented July 26, 1904.

UNITED STATES PATENT OFFICE.

GEORGE H. SHELLABERGER, OF DEKALB, ILLINOIS, ASSIGNOR TO APEX MANUFACTURING COMPANY, OF KANSAS CITY, MISSOURI, A CORPORATION OF ARIZONA TERRITORY.

ORE-ROASTING FURNACE.

SPECIFICATION forming part of Letters Patent No. 765,997, dated July 26, 1904.

Application filed February 1, 1904. Serial No. 191,515. (No model.)

*To all whom it may concern:*

Be it known that I, GEORGE H. SHELLABERGER, a resident of Dekalb, in the county of Dekalb and State of Illinois, have invented certain new and useful Improvements in Ore-Roasting Furnaces, of which the following is a specification.

This invention relates to improvements in ore-roasting furnaces, and refers more particularly to an improved type of rotary furnace wherein the interior of the furnace is divided into a plurality of separate chambers extending longitudinally of the furnace and so arranged and constructed that the ore is fed longitudinally through the furnace-body in one direction and returned through other chambers and delivered at or near the same end into which it was fed.

Among the salient objects of the invention are to provide a construction in which the furnace interior is divided into a plurality of ore-chambers and interspersed heat-flues, one or more primary or receiving ore-chambers being provided into which the ore is introduced and other secondary or return ore-chambers being arranged to communicate with the primary ore-chamber; to provide a construction in which the ore while passing the primary ore chamber or chambers is subjected to a gentle and gradually-increasing heat, whereby it is effectually dried before it passes into those portions of the furnace where the actual roasting is accomplished; to provide a construction in which the ore during its travel through the furnace in both directions is constantly agitated or rabbled in a most thorough and effective manner and in such manner that the rabbling operates to feed the ore or cause it to progress through the furnace; to provide a construction in which the primary ore chamber or chambers is or are surrounded by a series of concentrically-arranged air-flues, which serve as means for supplying air to the return-chambers and at the same time protect the primary or receiving ore-chamber from the direct heat of the heat-generating furnace; to provide a construction in which the distribution of air to the ore-chambers is uniform and subject to control at will; to provide in a furnace of the general character referred to a construction in which the ore is fed from the primary or receiving ore-chamber into the secondary or return chambers automatically and without interruption, so that the progress of the ore through the furnace and back is uniform and regular; to provide a construction in which the travel of the ore through the furnace is effected entirely by the tumbling action of the ore as the furnace-body rotates, whereby the rate of feed is determined and regulable by the rate of rotation of the furnace-body; to provide in conjunction with a furnace of the general character referred to means for automatically feeding into the ore-chambers regulated quantities of salt or other granular refining agents; to provide in mechanism for thus automatically introducing refining agents a construction which will effect the introduction of the refining agent during the operation of the furnace and without unsealing or opening the ore-chambers during such introduction; to provide a furnace of the general character referred to, the furnace-body of which is of sectional construction, whereby it may be cast or formed in separate parts and assembled, special reference being had to so constructing the furnace that it is capable of being transported in small sections, and in general to provide an improved and effective construction and arrangement of the character referred to.

To the above ends the invention consists in the matters hereinafter described, and more particularly pointed out in the appended claims, and the invention will be readily understood from the following description, reference being had to the accompanying drawings, in which—

Referring first to Fig. 1, 2, 3, 4, 5, 6, 7, and 8 designate a series of generally cylindric furnace-body sections united end to end to form as a whole a rotatable furnace-body. At suitable intervals apart the furnace-body is provided with bearing-rings 9, the lower sides of which are seated and rotate within suitable journal-cradles 10, mounted upon a suitable masonry foundation, (designated as a whole 11.) 12 designates as a whole a heat-generating furnace, which in the preferred embodiment shown is located at one end of the ore-furnace body and has its combustion-chamber constructed to surround a part of the latter. The ore is fed into that end of the furnace-body which is in part surrounded or inclosed within the combustion-chamber 13 of the heat-generating furnace. Accordingly this end of the furnace-body, which protrudes through and some distance beyond the walls of the heat-generating furnace, is inclosed in a housing 14, which is so constructed as to constitute at its lower part a hopper 15 and at its upper part a fume-chamber 16, which communicates with a fume-stack 17. At its opposite end the ore-furnace body communicates with a somewhat similar housing 18, the interior of which constitutes a smoke-chamber 19, which communicates at its upper side with a smoke-stack 20, while at its lower side it is provided with a door 21, through which accumulated soot may be removed from time to time.

The ore-furnace body is rotated as a whole by means of any suitable mechanism, that shown herein comprising a gear-ring 22, mounted upon the exterior of the furnace-body and engaged and driven by a pinion 23, mounted upon a drive-shaft 24, which carries also a bevel-gear 25. The bevel-gear 25 is actuated from a transverse shaft 26, which is provided with a drive-pulley 26, which may be driven by means of any suitable belt-connections.

Figure 1:
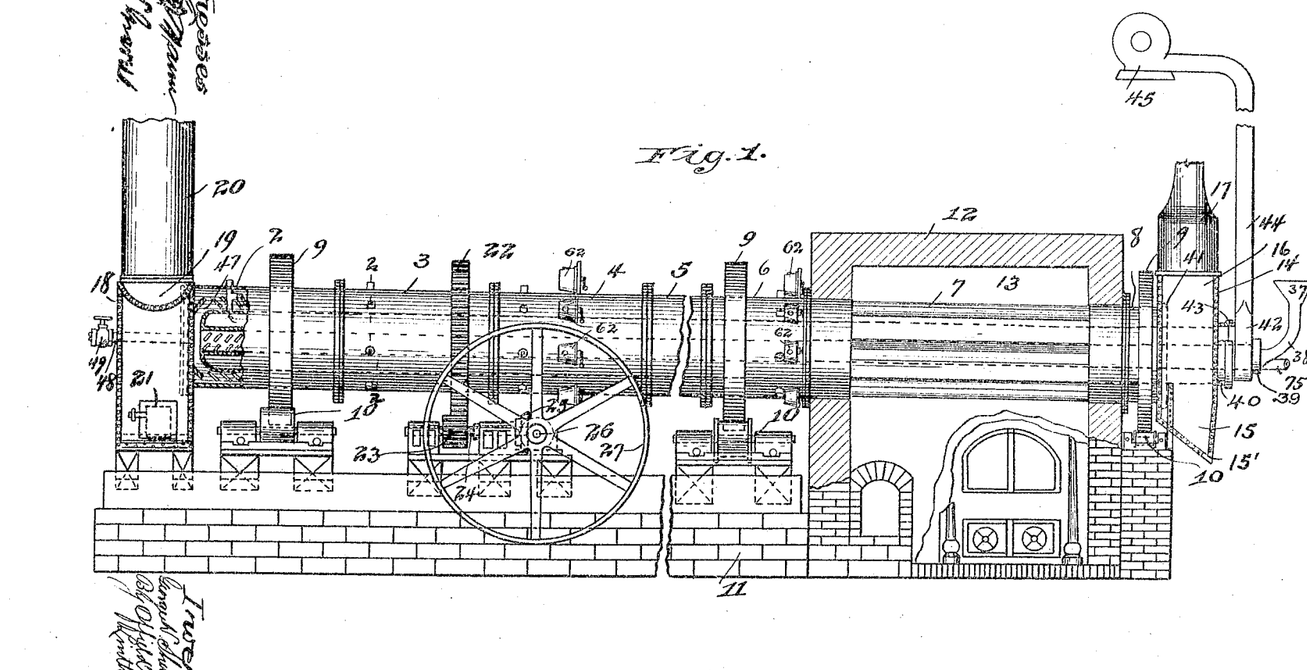
Figure 1 is a view chiefly in side elevation of a complete furnace embodying my invention, parts being shown in section to expose the internal construction and arrangement of the furnace.
Figure 2:
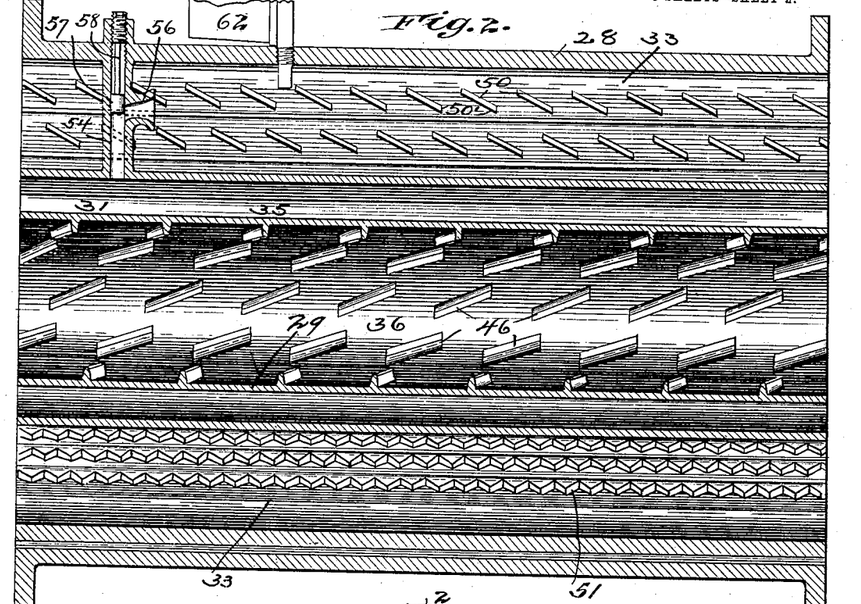
Fig. 2 is a longitudinal sectional view of one furnace-body section of a preferred embodiment of the invention, taken approximately on line 2 2 of Fig. 3.
Figures 3, 11, 12, 13:
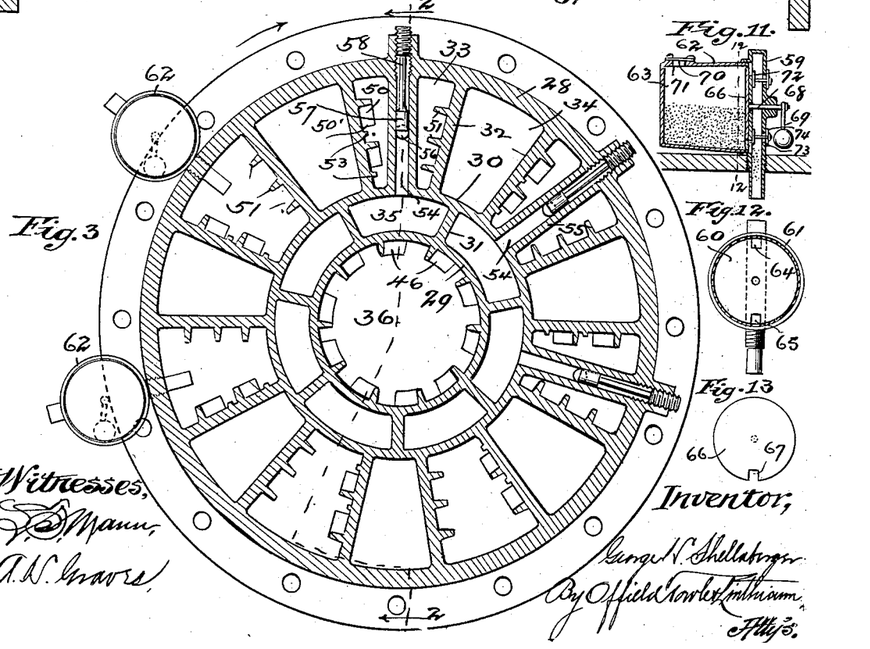
Fig. 3 is a cross-sectional view of one of the cylindric sections of the furnace-body, taken approximately on line 2 2 of Fig. 1.
Fig. 11 is an axial sectional view of one of the salt-feeding devices, showing the latter applied to the furnace-body.
Fig. 12 is a sectional view taken on line 12 12 of Fig. 11 and looking in the direction of the arrows, the valve-plate being, however, removed to expose the inner end face of the chamber.
Fig. 13 is a face view of the valve-plate which controls the outlet-passages through the end wall of the chamber shown in Fig. 12.

Describing now more particularly the internal construction of the ore-furnace and referring to Figs. 2 and 3, each of the several cylinder-sections 2 3 4, &c., except that one which extends through the combustion-chamber of the heating-furnace, comprises an outer cylindrical shell or wall 28 and an inner concentrically-disposed shell or wall 30, interspersed between the outer and inner shells. Between the several concentrically-disposed shells are extended two sets of radially-disposed longitudinally-extending partition-walls 31 and 32, respectively, whereby the spaces between the outermost shells are subdivided into longitudinally-extending alternately-disposed ore-chambers 33 and heat-flues 34, while the space between the two shells is subdivided into a series of separate air-flues 35, there being one air-flue for each ore-chamber 33, arranged in radial register with the latter. The central tubular space 36 constitutes the receiving ore-chamber, through which the ore is first passed, and will be hereinafter referred to as a "primary" ore-chamber. It will be understood that the several cylindrical sections 2 3 4, &c., are of similar internal construction and are united end to end, so that the respective chambers therein register and form longitudinally-extending passages leading throughout the length of the furnace-body except as hereinafter explained. In the case of that section 7 which is located within the combustion-chamber of the heat-generating furnace those portions of the outer shell 28 which in the remaining sections form the outer circumferential walls of the heat-flues are omitted, so that the ore-chambers 33 (hereinafter referred to as the "secondary" ore-chambers) are directly exposed to the combustion-chamber on three sides and so that the receiving ends of the heat-flues 34 open directly into said combustion-chamber, and the products of combustion may pass into the heat-flues and thence to the smoke-chamber and smoke-stack.

Describing now the ore-feeding apparatus and the circulation of the ore through the furnace-body, 37 designates a feed-hopper which is provided with a feed-chute 38, leading downwardly to and communicating with the central passage or primary ore-chamber of the furnace-body, it being noted in this connection that the inner wall 29 and the intermediate wall 30 of the furnace-body are extended through and beyond the walls of the housing 14, as indicated at 39 and 40, respectively, while the outer shell of this section of the furnace terminates at a point approximately coincident with the inner side wall of the housing 14, as indicated in dotted lines at 41. The feed-chute 38 communicates with the primary ore-chamber through a suitable swiveling connection, as indicated clearly in the drawings.

Adjacent to the end of the extended portion 40 of the furnace-body is mounted an annular housing 42, which surrounds the primary ore-chamber extension 39 and is in open communication at its inner side with the receiving ends of the several air trunks or passages 35. This casing 42 is similarly united with the furnace-body by a swiveling connection, as indicated at 43. With the upper side of the casing 43 communicates an air-pipe 44, through which air is supplied from any suitable source—as, for example, from an ordinary blower 45.

The primary ore-chamber is provided internally with a series of radially-projecting and diagonally-disposed rabbles 46, preferably, as shown herein, arranged in offset or staggered ralation and all having the same general direction of inclination, so that when the ore-furnace body is rotated in the proper direction the rabbling or tumbling of the ore will effect a feeding of the latter rearwardly or toward the smoke-stack end of the furnace-body. The ore is fed longitudinally through the primary chamber and at the rear end of the furnace passes radially outward through suitable communicating passages 47 into the several secondary ore-chambers 33, it being understood that the ore will fall by gravity from the primary ore-chamber into each of the secondary ore-chambers as the latter are passing through the lower halves of their revolution. During its passage through the primary ore-chamber the ore is dried and in so drying evolves more or less vapor. In order to provide for the escape of this vapor, an outlet-pipe 48 is conveniently arranged to communicate with the discharge end of the primary chamber, this outlet-pipe being disposed axially of the furnace-body and extending out through the smoke-chamber housing and provided at a suitable point outside of said casing with a controlling valve or cock 49.

The secondary ore-chambers are each provided with two sets of rabble projections, as 50 and 51, respectively, these rabble projections being located on the side or radial walls of the chambers, so as to be approximately oppositely disposed. The set of rabbles 50 desirably have the form of outstanding flange-like projections inclined obliquely forwardly or toward the delivery end of the furnace and inwardly toward the axis of the furnace-body. The discharge edges 50' of these rabbles extend transversely of the chamber, so that the ore in discharging from the rabbles is spread out into sheet-like streams, which are disposed transversely of the ore-chamber passage. In order to deflect the ore away from the side walls of the ore-chamber, longitudinally-extending ribs or secondary rabbles 53 are provided located just below or radially inside of each set of rabbles 50.

The opposed set of rabbles 51 are desirably in the form of rows of longitudinally-alined saw-tooth-shaped projections, as shown clearly in Fig. 2, the rabble projections of one set being offset radially with relation to those of the next set, so that the ore is more effectively rabbled or tumbled in passing from one part of the ore-chamber to the other over these rabbles.

It will be understood from the foregoing description that assuming the ore-furnace body to be rotated to the right, as viewed in Fig. 3, as each secondary ore-chamber rises the ore will be tumbled radially inward to the bottom of the ore-chamber over the rabbles 50 and as the same ore-chamber descends in the other half of its revolution the ore will be again tumbled, but this time will flow from the rabbles 51. Accordingly the ore will be fed forwardly during each alternate rabbling action only. It will be also noted that the obliquely-disposed edges of the saw-tooth-shaped rabbles will distribute the streams of ore transversely of the ore-chamber, a feature of importance, as will be hereinafter explained.

During the travel of the ore through the secondary ore-chambers heated air is admitted thereto at intervals, and to this end each secondary ore-chamber is provided with an air-inlet 54, in the present instance taking the form of a pipe 55, which communicates with the corresponding air-trunk 35 and extends thence radially out entirely through the ore-chamber. At a point within the ore-chamber each pipe 55 is provided with an outlet 56, directed toward the delivery end of the furnace and controlled by means of a piston-valve 57, which is provided with a stem 58, the outer end of which is threaded within the outer end of the air-pipe and is capable of being adjusted from the exterior of the furnace. These air-supply pipes 55 may be distributed at as frequent intervals throughout the length of the ore-chambers as desired; but in practice I have found that one such air-pipe is sufficient for each chamber of each trunk-section of the furnace-body.

Describing now one of the devices for introducing salt or other refining agent in granular form to the secondary ore-chambers and referring more particularly to Figs. 1, 3, 11, 12, and 13, 59 designates a hollow support sealed as to the outer atmosphere, but communicating at its inner end with the ore-chamber. Preferably, and as shown herein, said hollow support 59 is of tubular form, the outer portion thereof being rectangular in cross-section, while that portion which extends within the furnace-body is cylindric and externally threaded, so as to seat therein nipple fashion. Upon one side said hollow support is provided with an integral circular plate 60 and surrounding the latter a peripheral flange 61. 62 designates a cylindric casing closed at one end and secured at its opposite open end to the flange 61, so as to form, in conjunction with the plate 60, a closed chamber 63. Through the plate 60 are formed two outlet-apertures 64 and 65, which are located at diametrically opposite points of the periphery of the plate and afford communication between the chamber 63 and the interior of the hollow support 59. These openings or ports are controlled by means of a rotary valve-plate 66, provided with a single peripheral port-opening 67 and mounted upon a shaft 68, which is journaled to extend through the hollow support 59 and is provided at its outer end with a weighted arm 69. The weighted arm 69 serves to rotate the valve-plate by gravity as the furnace-body rotates, so that the port 67 is alternately brought into register with the upper and lower ports 64 and 65, communicating with the interior of the hollow support. In operation the granulated material is fed from the chamber 63 directly into the ore-chamber through the lower port 65 while the ore-chamber is passing through the uppermost part of its revolution, and when the feeding device is carried around through the lower half of the revolution of the furnace-body a second charge of salt or other agent is delivered from the chamber 63 into the upper part of the hollow support 59 and is there retained until the support is inverted sufficiently to cause the material to fall by gravity into the ore-chamber, which will occur while the latter is rising, but some time before it reaches that point at which the lower port 65 is opened. In order to replenish the chamber 63 from time to time, a slide-cover 70 is secured to the outside of the casing and arranged to contral an inlet-opening 71. In order to regulate the amount of salt discharged at each feeding movement, the two ports 64 and 65 are controlled by adjustable slides 72, provided with stems extending out through slots 73 in the opposite wall of the hollow support, the slots 73 being covered by escutcheon-plates 74, surrounding and moving with the stems of the sliding plates.

The ore is discharged from the open ends of the secondary chambers directly into the hopper 15 and from the latter escapes through a discharge-opening 15' into any suitable conveyer mechanism. The fumes and air from the secondary ore-chambers pass into the fume-chamber 16 and thence to the fume-stack 17, which may, if desired, be arranged to communicate with any suitable apparatus whereby the acids and other by-products may be recovered.

Inasmuch as it is sometimes desirable to regulate the temperature of the interior of the primary ore-chamber independently of the heat imparted thereto from the heat-generating furnace I have provided an auxiliary air-inlet pipe 75, which is connected with the receiving end of said ore-chamber and communicates with any suitable source of air under pressure. The air thus introduced may be either cooler than the normal temperature of the primary ore-chamber, so as to have a cooling effect, or it may be heated, so as to increase the temperature of the primary ore-chamber above that produced by the heat-furnace.

The operation of the furnace has been clearly indicated throughout in connection with the description of the mechanism; but it may be briefly noted that in operation of the furnace the primary ore-chamber is never heated to a high temperature, because it is inclosed throughout its length by the several air-flues, which are constantly supplied with fresh air, and therefore prevent the temperature from rising above the desired point. It follows that the receiving end of the primary ore-chamber is the cooler end and that the heat rises constantly from the receiving end of the furnace-body to the rear end thereof, so that the ore is gradually raised from its normal temperature to a temperature at which roasting begins. It will be also noted that the construction and arrangement of the rabbles in the secondary or roasting chambers are such that the occurrence of air forced therethrough from the air-supply trunks will be driven through the transversely-distributed sheets or streams of ore, and thus most effectively and uniformly oxidize the ore. Moreover, the arrangement is such that the air and gases evolved from the ores are caused to constantly progress through the furnace, so that the gases evolved cannot blanket the masses of ore, and thus retard the oxidation.

Figure 10:
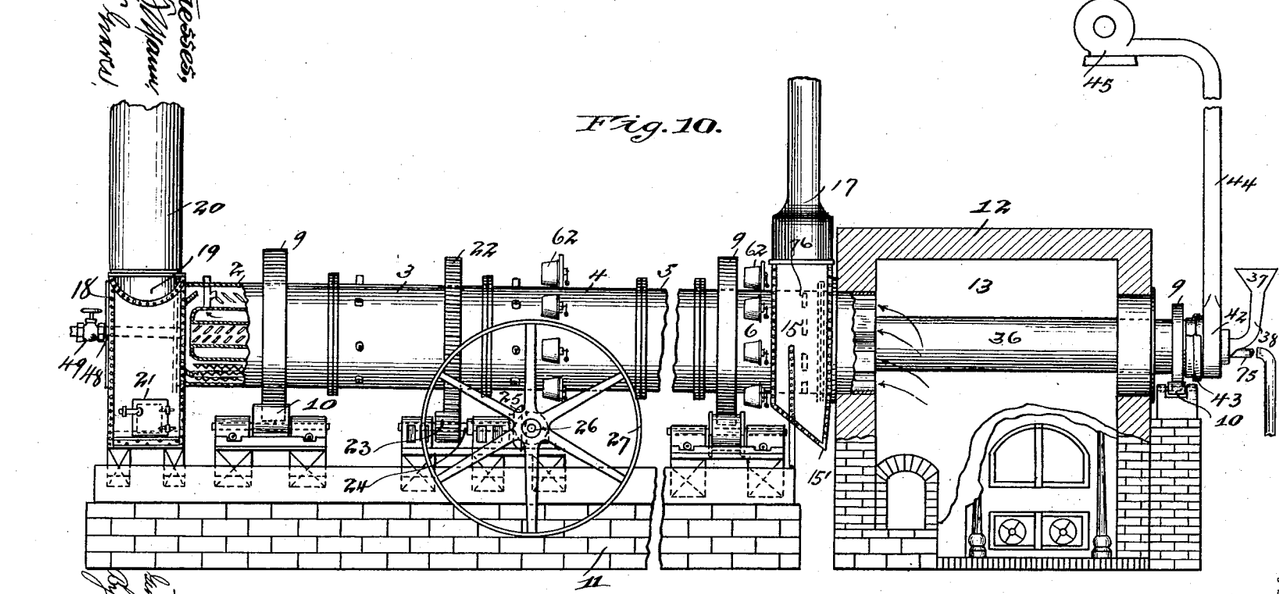
Fig. 10 is a view generally similar to Fig. 1, but showing a construction in which the furnace-body instead of extending as an entirety through the combustion-chamber of the heat-generating furnace is interrupted as to its return ore-chambers just outside of the inner wall of the heat-generating furnace.

In Figs. 10, &c., I have shown various modifications of the invention.

In Fig. 10 a construction is shown in which the primary ore-chamber and air-trunks, as in the previously-described construction, extend throughout the full length of the furnace-body, but the secondary ore-chambers terminate at a point intermediate of the length of the furnace-body adjacent to the outside of the inner wall of the heat-generating furnace. Accordingly the fume-chamber and hopper-housing 16' are located at this point, and the secondary ore-chambers are each provided with an outlet-port 76, which discharges into a hopper. The internal construction of the several furnace-body sections may be the same as that hereinbefore described, or it may be of any of the modified constructions hereinafter described.

Figure 4:
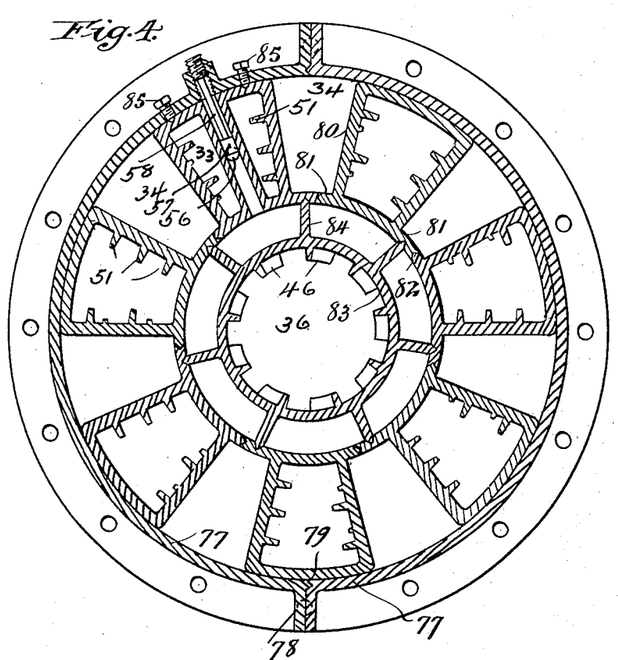
Fig. 4 is a view similar to Fig. 3, showing a modification in which the furnace-body is cast in sections separating on longitudinal lines.
Figure 5:
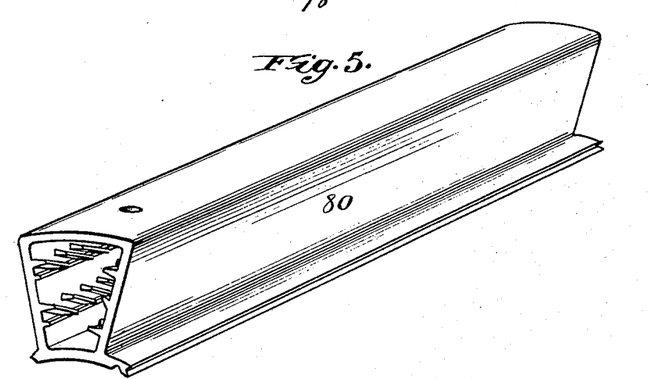
Fig. 5 is a perspective view of one of the segmental sections composing a part of the furnace-body construction, as shown in Fig. 4.

In Figs. 4 and 5 is shown a construction of a furnace-body section which is generally similar to that first described and shown in Figs. 2 and 3, except that the parts are made in sections. To this end the outer shell is shown as composed of two semicylindric sections 77, provided with diametrically opposite longitudinally-extending flanges 78, whereby they may be bolted together. The meeting-joints are interfitted, as indicated at 79, so as to effect a more perfect union, the construction of these joints being such that they may be sealed with cement. Each of the primary combustion-chambers is made in the form of a segmental section 80, which at its exterior fits within an outer shell and at its bottom wall or inner side is provided with circumferentially-extending flange projections 81, which, when the several sections are assembled, form the intermediate concentric shell or wall of the furnace-body section and the bottoms of the heat-flues. These flange extensions at their meeting-points are also interfitted, as indicated at 82. The inner shell 83, forming the primary chamber, is cast in a single piece and provided upon its exterior with longitudinally-extending ribs or webs 84, which form the division-walls between the several air-flues. These webs 84 at their outer edges fit in suitable recesses formed in the flanges 81 of the segmental sections. Each of the segmental sections is held rigidly against movement by means of set-screws 85 inserted through the outer shell and impinging against the outer walls of the segments, as shown clearly in Fig. 4. It will be noted that the construction as a whole is such that the outer shell-sections may first be united and the segments and central member afterward inserted endwise or longitudinally within the shell and secured in position. The construction is of especial value and importance where it is desired to transport the furnace to points accessible only by pack trail, and, furthermore, it will be obvious that any portion of the furnace can be replaced in case of breakage without replacing the structure as a whole.

Figure 6:
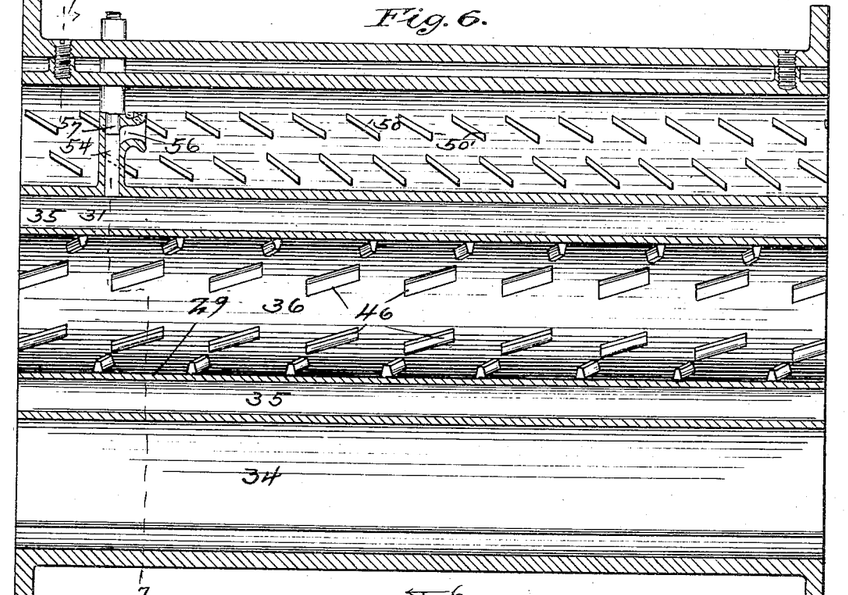
Fig. 6 is a longitudinal sectional view of still another modification, taken on the indirect line 6 6 of Fig. 7.
Figure 7:
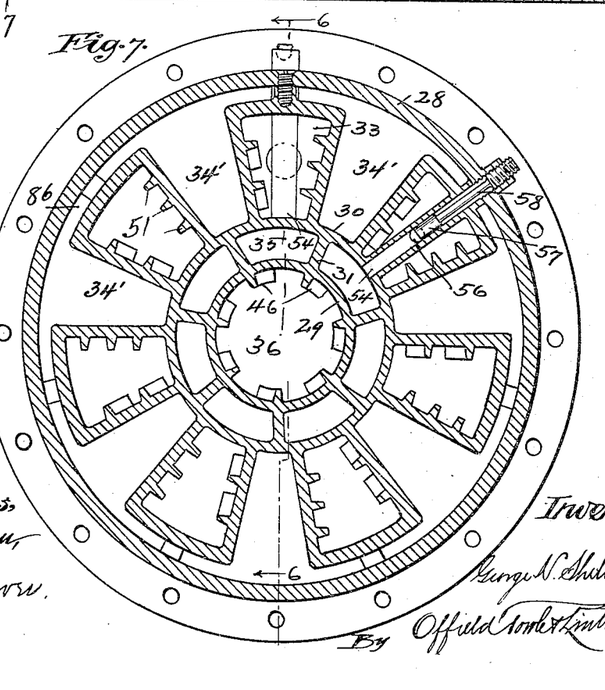
Fig. 7 is a transverse sectional view taken on the indirect line 7 7 of Fig. 6 and looking in the direction of the arrows.

In Figs. 6 and 7 is shown still another modification having the same general characteristics as that shown in Figs. 4 and 5, the chief difference being that the outer shell is made as one member and the remaining portion of the section or entire interior made as an integral second section. The inner section is constructed to slide endwise within the outer shell and is, as in the previous construction, secured in place by means of set-screws. In this instance the outer walls of the secondary ore-chambers are spaced away from the interior of the shell so as to provide heat-circulating spaces 86 in communication with the heat-flues 34', the ore-chambers being accordingly practically surrounded by heat-passages on three sides.

Figure 8:
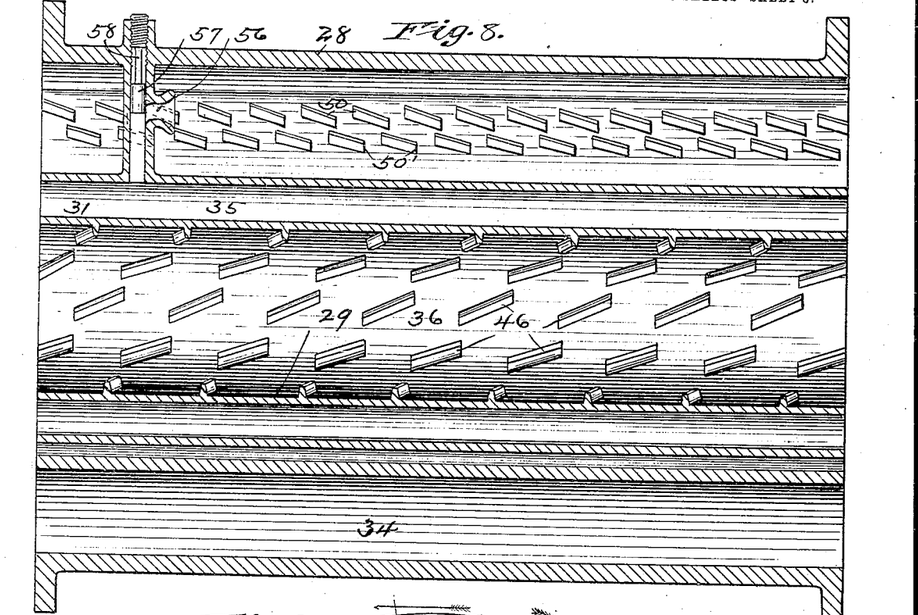
Figs. 8 and 9 are views similar to Figs. 6 and 7, respectively, showing still another modification.
Figure 9:
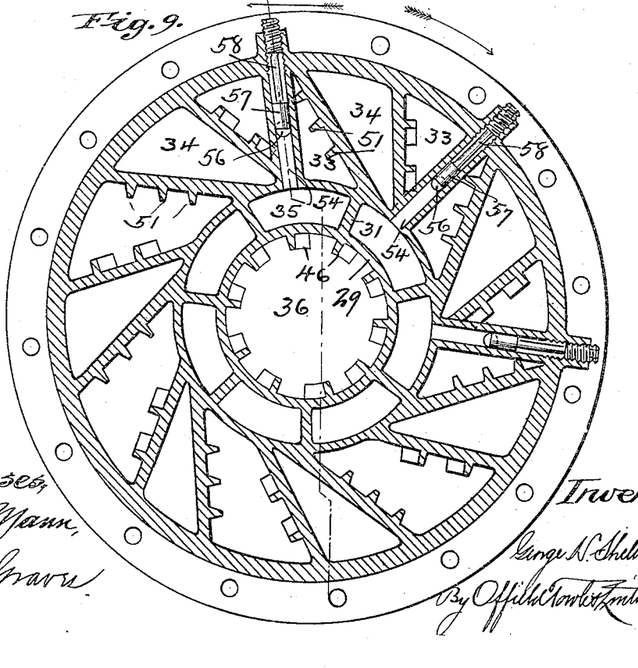

In Figs. 8 and 9 I have shown a modification generally like that shown in Figs. 2 and 3, the difference being that the partition-walls which form the sides of the secondary ore-chambers and heat-flues are tangentially disposed or inclined, so that the section may be cast as an entirety without danger of cracking under contraction.

It will be understood from the foregoing that the details of construction may be modified without departing from the spirit of the invention, and I do not, therefore, limit myself to the particular details of construction shown herein except to the extent that the same are made the subject of specific claims.

I claim as my invention—

1. In an ore-roasting furnace, a furnace-body comprising a longitudinally-extending primary ore-chamber, a communicating return or secondary ore-chamber, said chambers being sealed against the admission of the products of combustion thereto, and an interposed air-flue.

2. In an ore-roasting furnace, a furnace-body comprising a longitudinally-extending primary ore-chamber, a communicating return or secondary ore-chamber, and an interposed air-flue arranged to communicate with the secondary chamber only.

3. In an ore-roasting furnace, a furnace-body comprising a plurality of longitudinally-extending separate ore-chambers, one of said chambers constituting a primary ore-chamber and others constituting return or secondary ore-chambers in communication with the primary ore-chamber, said ore-chambers being sealed against the admission of the products of combustion thereto, a plurality of interspersed air-passages, and means for supplying air to each of the return ore-chambers.

4. In an ore-roasting furnace, a furnace-body comprising a plurality of longitudinally-extending separate ore-chambers, one of said chambers constituting a primary ore-chamber and others constituting return or secondary ore-chambers in communication with the primary ore-chamber, said ore-chambers being sealed against the admission of the products of combustion thereto, a plurality of interspersed air-passages, means for supplying air to each of the return ore-chambers, and means for actuating said furnace-body as a whole to effect a mechanical agitation of the contents thereof.

5. In an ore-roasting furnace, a furnace-body comprising a plurality of concentrically-disposed, longitudinally-extending ore-chambers, a plurality of longitudinally-extending heat-flues interspaced to alternate between the said ore-chambers, an air-trunk extending longitudinally of the furnace, communicating passages between said air-trunk and said ore-chambers, and a centrally-disposed ore-chamber with which each of said concentrically-disposed ore-chambers is in communication.

6. In an ore-roasting furnace, a furnace-body comprising a plurality of concentrically-disposed, longitudinally-extending return ore-chambers, a centrally-disposed, longitudinally-extending primary ore-chamber communicating at its end remote from its receiving end with each of the return ore-chambers, longitudinally-extending heat-flues interposed between each adjacent pair of return ore-chambers, and an annular air-trunk surrounding the central primary ore-chamber and interposed between the latter and the return ore-chambers.

7. In an ore-roasting furnace, a furnace-body comprising a plurality of concentrically-disposed, longitudinally-extending return ore-chambers, a centrally-disposed, longitudinally-extending primary ore-chamber communicating at its end remote from its receiving end with each of the return ore-chambers, longitudinally-extending heat-flues interposed between each adjacent pair of return ore-chambers, and an annular air-trunk surrounding the central primary ore-chamber and interposed between the latter and the return ore-chambers, said air-trunk being longitudinally divided into a plurality of flues or passages corresponding to the several secondary ore-chambers and respectively arranged to communicate with the latter.

8. In an ore-roasting furnace, a furnace-body comprising a plurality of concentrically-disposed, longitudinally-extending return ore-chambers, a plurality of heat-flues interspaced between said ore-chambers, an axially-disposed primary ore-chamber provided at its end remote from its receiving end with radial passages communicating with the respective return ore-chamber, an annular air-trunk interspaced between the primary and return ore-chambers and provided with outlet-passages leading to each return ore-chamber, feeding-rabbles arranged within the primary and return ore-chambers to effect a progressive travel of the ore through the primary chamber and return-chambers, and mechanism for rotating said furnace-body as a whole.

9. In an ore-roasting furnace, a furnace-body comprising a plurality of concentrically-disposed, longitudinally-extending return ore-chambers, a plurality of heat-flues interspaced between said ore-chambers, an axially-disposed primary ore-chamber provided at its end remote from its receiving end with radial passages communicating with the respective return ore-chamber, an annular air-trunk interspaced between the primary and return ore-chambers and provided with outlet-passages leading to each return ore-chamber, feeding-rabbles arranged within the primary and return ore-chambers to effect a progressive travel of the ore through the primary chamber and return-chambers, mechanism for rotating said furnace-body as a whole, and a heat-generating furnace the combustion-chamber whereof is in constant communication with the heat-flues of the ore-furnace body.

10. In an ore-roasting furnace, a furnace-body comprising a plurality of concentrically-disposed, longitudinally-extending return ore-chambers, a plurality of longitudinally-extending heat-flues interspaced between said return ore-chambers, a centrally-disposed primary ore-chamber, an annular air-trunk interposed between said primary and return ore-chambers, and a series of longitudinally-separated air-pipes leading from said annular air-trunk into each of the several return ore-chambers.

11. In an ore-roasting furnace, a furnace-body comprising a plurality of concentrically-disposed, longitudinally-extending return ore-chambers, a plurality of longitudinally-extending heat-flues interspaced between said return ore-chambers, a centrally-disposed primary ore-chamber, an annular air-trunk interposed between said primary and return ore-chambers, a series of longitudinally-separated air-pipes leading from said annular air-trunk into each of the several return ore-chambers, and valves arranged to control said several air-pipes.

12. In an ore-roasting furnace, the combination of a revolubly-mounted, horizontally-disposed furnace-body provided with a plurality of separate return ore-chambers, interspaced heat-passages extending longitudinally thereof, a centrally-disposed primary ore-chamber, a plurality of air-flues surrounding said primary ore-chamber and severally communicating with the return ore-chambers, a heat-generating furnace having its combustion-chamber in communication with the heat-flues of the revoluble furnace-body, means for feeding ore into that end of the primary chamber nearer the heat-generating furnace, a fume-chamber and hopper in communication with the discharge ends of said return ore-chambers, and means for revolving said furnace-body.

13. In an ore-roasting furnace, the combination of a revolubly-mounted, horizontally-disposed furnace-body, provided with a plurality of separate return ore-chambers, interspaced heat-passages extending longitudinally thereof, a centrally-disposed primary ore-chamber, communicating passages between said primary ore-chamber and each of the return ore-chambers, an annular air-trunk surrounding and inclosing the primary ore-chamber, and communicating with the several return ore-chambers, a heat-generating furnace, through the combustion-chamber of which the body of said ore-furnace extends and beyond which the receiving end of the furnace-body projects, means for feeding ore into the receiving end of said primary ore-chamber, means for feeding ore into the contiguous end of said annular air-trunk, and means for rotating said furnace-body bodily, the several heat-flues as to that portion of the furnace-body which extends through the combustion-chamber of the heat-furnace being open at one side to the combustion-space, substantially as described.

14. In an ore-roasting furnace, a furnace-body section comprising an external cylindric shell and a plurality of internal longitudinally-extending partition-walls dividing the interior of the section into a plurality of alternating ore-chambers and heat-passages, said ore-chambers being sealed against the admission of the products of combustion thereto, for the purpose set forth.

15. In an ore-roasting furnace, a furnace-body section comprising an external cylindric shell and a plurality of internal longitudinally-extending partition-walls whereby the interior of the section is divided into a plurality of ore-chambers and heat-passages alternated, said body-section being made in longitudinally-divisible sections, said ore-chambers being sealed at their ends against the admission of the products of combustion, for the purpose set forth.

16. In an ore-roasting furnace, a furnace-body section comprising an outer separately-formed cylindric shell formed in longitudinally-divisible segments and an inner separately-formed member comprising a plurality of radial partition-walls one or more axially-concentric walls, and end closures for a part of the chambers formed by said walls whereby said furnace is divided into a plurality of sealed ore-chambers, open heat-flues and air-passages, substantially as described.

17. In an ore-roasting furnace, a furnace-body section comprising an outer separately-formed cylindric shell consisting of a plurality of longitudinally-divided segments and a plurality of segmental-shaped members arranged within, and occupying said outer shell, said segmental members having walls arranged to conjointly divide the interior of the furnace-body sections into a plurality of separate longitudinally-extending heat and air passages and sealed ore-chambers.

18. In an ore-roasting furnace, a furnace-body section comprising an outer cylindric shell and a separately-constructed sectional interior comprising a centrally-disposed tubular member and a plurality of segmental-shaped partitioning members concentrically arranged within an outer shell and occupying the space between the latter and the exterior of said tubular central member, said segmental members being constructed to divide the interior of the furnace-body section into a plurality of sealed ore-chambers, with heat-flues and air-passages interspersed therebetween, substantially as described.

19. In combination, a revoluble ore-roasting furnace, and a device for introducing a granular refining agent comprising a closed receptacle mounted upon, and moving with the revoluble furnace-body, said receptacle having an outlet-passage extending through the wall of the ore-chamber of the furnace and communicating with the interior of the latter, and being provided with a gravity-actuated valve operating to automatically open and close said passage, substantially as described.

20. In combination with a rotary ore-roasting-furnace body, a device for introducing a refining agent comprising a closed receptacle mounted upon the exterior of the furnace-body and provided with an outlet-pipe communicating with the interior of the ore-roasting chamber, a rotatably-mounted valve arranged to control the communicating passage between said closed receptacle and ore-chamber, and a weighted arm pivotally connected with the valve whereby the latter is caused to rotate upon its own axis during the revolution of the furnace-body and alternately opens and closes said communicating passage.

GEORGE H. SHELLABERGER.

Witnesses:
A. H. GRAVES,
FREDERICK C. GOODWIN.